US011557205B2

(12) United States Patent
Ge et al.

(10) Patent No.: US 11,557,205 B2
(45) Date of Patent: Jan. 17, 2023

(54) DRIVING ASSISTANCE SYSTEM (71) Applicant: HASCO VISION TECHNOLOGY CO., LTD., Shanghai (CN)

(72) Inventors: Bin Ge, Shanghai (CN); Tao Zhang, Shanghai (CN); Minghua Zhu, Shanghai (CN); Tianzhong Guo, Shanghai (CN)

(73) Assignee: HASCO VISION TECHNOLOGY CO., LTD., Shanghai (CN)

(*) Notice: Subject to any disclaimer, the term of this patent is extended or adjusted under 35 U.S.C. 154(b) by 353 days.

(21) Appl. No.: 16/759,492

(22) PCT Filed: Jan. 19, 2020

(86) PCT No.: PCT/CN2020/072962
§ 371 (c)(1),
(2) Date: Apr. 27, 2020

(87) PCT Pub. No.: WO2021/134847
PCT Pub. Date: Jul. 8, 2021

(65) Prior Publication Data
US 2021/0407294 A1    Dec. 30, 2021

(30) Foreign Application Priority Data
Dec. 31, 2019  (CN) .......................... 201911424649.5

(51) Int. Cl.
G08G 1/16        (2006.01)
H04W 4/46        (2018.01)
(Continued)

(52) U.S. Cl.
CPC ............... *G08G 1/16* (2013.01); *B60Q 1/503* (2013.01); *B60R 16/0231* (2013.01); *G01J 1/58* (2013.01);
(Continued)

(58) Field of Classification Search
CPC .......... G08G 1/16; G08G 1/0965; G08G 1/04; G08G 1/161; H04W 4/023; H04W 4/46;
(Continued)

(56) References Cited

U.S. PATENT DOCUMENTS

2009/0066538 A1    3/2009 Thomas et al.
2011/0231058 A1*   9/2011 Hanna .................... B62B 5/063
                                                    701/41
(Continued)

FOREIGN PATENT DOCUMENTS

CN    103093645 A    5/2013
CN    103531035 A    1/2014
(Continued)

OTHER PUBLICATIONS

Office Action dated Jul. 15, 2020 issued in Chinese Patent Application No. 201911424645.7 (8 pages).
(Continued)

*Primary Examiner* — Behrang Badii
(74) *Attorney, Agent, or Firm* — Polsinelli PC (57) ABSTRACT The present disclosure relates to a driving assistance system, includes: a light detection and ranging module configured to detect position parameters of objects around the light detection and ranging module; a LiFi driving module connected to the light detection and ranging module and being capable of receiving the position parameters and modulating the position parameters to generate a LiFi signal; and a lighting module connected to the LiFi driving module, and configured to provide lighting and transmit the LiFi signal.

17 Claims, 7 Drawing Sheets (51) Int. Cl.
  *G01S 17/931* (2020.01)
  *B60Q 1/50* (2006.01)
  *B60R 16/023* (2006.01)
  *G01J 1/58* (2006.01)
  *H04B 10/116* (2013.01)

(52) U.S. Cl.
  CPC .......... *G01S 17/931* (2020.01); *H04B 10/116* (2013.01); *H04W 4/46* (2018.02)

(58) Field of Classification Search
  CPC ........ G01S 7/003; G01S 17/931; F21S 45/70; F21S 45/43; F21S 41/25; F21S 41/24; F21S 41/176; F21S 41/16; B60Q 1/535; B60Q 1/507; B60Q 1/5035; B60Q 1/0023; B60Q 1/503; H04B 10/116; G01J 1/58; B60R 16/0231
  See application file for complete search history.

(56) References Cited

U.S. PATENT DOCUMENTS

| | | | |
|---|---|---|---|
| 2013/0282271 | A1 | 10/2013 | Rubin et al. |
| 2018/0186290 | A1* | 7/2018 | Ward ..................... B60R 1/002 |
| 2018/0301148 | A1* | 10/2018 | Roman .................. G10L 15/22 |
| 2019/0141134 | A1* | 5/2019 | Hu ........................ H04L 67/125 |
| 2020/0090510 | A1* | 3/2020 | Nagarajan ........ G08G 1/096716 |
| 2020/0257907 | A1* | 8/2020 | Kompalli .................. G06T 7/13 |
| 2022/0153273 | A1* | 5/2022 | Metli ............. B60W 30/18154 |

FOREIGN PATENT DOCUMENTS

| | | |
|---|---|---|
| CN | 103903478 A | 7/2014 |
| CN | 104583805 A | 4/2015 |
| CN | 204786017 U | 11/2015 |
| CN | 105844962 A | 8/2016 |
| CN | 106059666 A | 10/2016 |
| CN | 106941513 A | 7/2017 |
| CN | 108445468 A | 8/2018 |
| CN | 108682163 A | 10/2018 |
| CN | 110094692 A | 8/2019 |
| CN | 209341136 U | 9/2019 |

OTHER PUBLICATIONS

Office Action dated Sep. 21, 2020 issued in Chinese Patent Application No. 201911424645.7 (9 pages).
Office Action dated Jul. 3, 2020 issued in Chinese Patent Application No. 201911424649.5 (12 pages).
Office Action dated Sep. 14, 2020 issued in Chinese Patent Application No. 201911424649.5 (11 pages).
Chinese Office Action dated Nov. 24, 2020 issued in counterpart Patent Application No. 201911424649.5 (10 pages).
Chinese Office Action dated Feb. 8, 2021 issued in counterpart Patent Application No. 201911424649.5 w/English Translation (16 pages).
Chinese Notice of Rejection dated Apr. 1, 2021 issued in counterpart Patent Application No. 201911424649.5 (8 pages).

* cited by examiner

DRIVING ASSISTANCE SYSTEM

CROSS-REFERENCE OF THE RELATED APPLICATIONS

This application is a National Phase of International Application No. PCT/CN2020/072962, filed Jan. 19, 2020, which claims priority to Chinese Patent Application No. 201911424649.5 filed on Dec. 31, 2019, and entitled "DRIVING ASSISTANCE SYSTEM", the contents of which are expressly incorporated by reference herein in their entireties.

TECHNICAL FIELD

The present disclosure relates to a field of automobile driving assistance, in particular, to a driving assistance system.

BACKGROUND

With the coming of the age of intelligence, intelligent driving technology has been increasingly studied. To assist driving, a detection device such as vehicle-mounted radar needs to be installed on a vehicle to detect the positional relationship between the vehicle and surrounding objects. Some position detection devices currently installed on the vehicle mostly feed the distance parameter between the detected object and the vehicle installed with a radar itself directly to said vehicle to assist driving, thereby avoiding an occurrence of the collision accident. However, when the distance between two vehicles are too short, the vehicle preceding another vehicle cannot realize the danger of collision. If before the occurrence of collision accident, the preceding vehicle can get this and take measures timely, the probability of occurring traffic accidents may be more effectively reduced. Nevertheless, there is no way to send dangerous information directly to the preceding vehicle at present. In addition, when the level of autonomous driving is higher, the current internet of vehicles that relies on 5G or WiFi is suitable for large-scale data interaction, but high-speed private information transmission between specific vehicles cannot be achieved, for example, the distress information, the information on road condition, etc. cannot be transmitted timely between travelling vehicles.

SUMMARY

According to various embodiments of the present disclosure, a driving assistance system is provided.

A driving assistance system, including:
A light detection and ranging module configured to detect position parameters of objects around the light detection and ranging module;
a LiFi driving module connected to the light detection and ranging module, where the LiFi driving module is capable of receiving the position parameters and modulating the position parameters to generate a LiFi signal; and
a lighting module connected to the LiFi driving module, and configured to provide lighting and transmit the LiFi signal.

In one of the embodiments, the light detection and ranging module, the LiFi driving module and the lighting module are provided on a host vehicle. A LiFi receiving module and a display module provided on the other vehicle are further included. The LiFi receiving module is configured to receive the LiFi signal transmitted by the lighting module and decode the LiFi signal into visual information. The display module is connected to the LiFi receiving module, for displaying the visual information.

In one of the embodiments, the light detection and ranging module and the lighting module are disposed at a head of the host vehicle. The LiFi receiving module and the display module are disposed at rear end of the other vehicle.

In one of the embodiments, the light detection and ranging module includes a detecting light source and a detecting assembly that are connected with each other. The detecting light source is configured to generate a detecting light. The detecting assembly is capable of transmitting the detecting light outward so as to detect the position parameters of the object. The lighting module comprises a lighting source and a lighting assembly that are connected with each other. The lighting source is configured to generate a lighting light. The lighting assembly is configured to receive the lighting light and transmit it outward.

In one of the embodiments, the LiFi driving module is integrated into a driver of the lighting source.

In one of the embodiments, the lighting source and the detecting light source are combined into a light source assembly. The light source assembly is connected to the lighting assembly and the detecting assembly through a light transmission component, respectively.

In one of the embodiments, the lighting assembly includes:
a mounting housing forming a cavity that traverse a front of the housing through to a back of that;
a fluorescent component disposed at a rear end of the mounting housing, where the fluorescent component is located on a light path of the lighting light transmitted by the light transmission component, and is configured to emit visible light under the excitation of the lighting light;
a light gathering unit disposed on a side of the fluorescent component, and configured to gather the visible light to form a lighting beam and transmit the lighting beam in the cavity;
a lens unit disposed at a front end of the mounting housing and configured to form the lighting beam to be a light emitted outward at a certain angle.

In one of the embodiments, the fluorescent component includes:
a heat sink fixed at the rear end of the mounting housing;
a fluorescent sheet fixed at the heat sink and located on the light path of the lighting light, and wherein the fluorescent sheet is capable of receiving and reflecting the lighting light, a surface of the fluorescent sheet faces the light gathering unit.

In one of the embodiments, further includes a light detection plate. The light detection plate is provided on the light path of the lighting light reflected by the fluorescent sheet, for detecting energy of the lighting light reflected by the fluorescent sheet.

In one of the embodiments, the fluorescent component includes a fluorescent sheet located on the light path of the lighting light. The fluorescent sheet is capable of receiving the lighting light and transmit the lighting light.

In one of the embodiments, both sides of the fluorescent sheet are provided with sapphire layers.

In one of the embodiments, the detecting assembly includes a transmitting module and a receiving module. The transmitting module is connected to other end of the light transmission component, and is configured to emit the detecting light transmitted by the light transmission component outward. The receiving module is configured to receive the reflected light of the detecting light.

In one of the embodiments, the transmitting module is disposed on a side of the lighting assembly, and the lens unit is provided with a light-uniformizing area for uniformizing the detecting light emitted by the transmitting module into a light beam with a uniform light intensity distribution and a specific emitting angle.

In one of the embodiments, the light-uniformizing area is disposed at an edge of a side of the lens unit or is disposed around the lens unit.

In one of the embodiments, the transmitting module is fixed to an inner wall of the mounting housing, and the transmitting module is separated from the lighting beam by a partition.

In one of the embodiments, the transmitting module includes one or more infrared lasers. The infrared laser(s) is fixed to the inner wall of the mounting housing through a fixing base. The fixing base is provided with a baffle for separating the transmitting module from the lighting beam.

In one of the embodiments, the light transmission component includes lighting-conducting fibers and detecting-conducting fibers. Two ends of the lighting-conducting fibers are connected to the lighting source and the lighting assembly respectively, for transmitting the lighting light to the lighting assembly. Two ends of the detecting-conducting fibers are connected to the detecting light source and the detecting assembly respectively, for transmitting the detecting light to the detecting assembly.

Details of one or more embodiments of the disclosure are set forth in the accompanying drawings and description below. Other features, objects, and advantages of the disclosure will be apparent from the description, the drawings, and the claims.

BRIEF DESCRIPTION OF THE DRAWINGS

For better describing and illustrating embodiments and/or examples of the invention disclosed herein, reference may be made to one or more drawings. The additional details or examples used to describe the drawings should not be considered as limiting the scope of any one of the disclosed inventions, the presently described embodiments and/or examples, and the best mode of these inventions currently understood.

In the figures, 10—host vehicle, 20—other vehicle, 21—display module, 100—light source assembly, 110—heat dissipating device, 200—light transmission component, 210—lighting-conducting fibers, 220—detecting-conducting fibers, 310—mounting housing, 330—light gathering unit, 340—lens unit, 341—light-uniformizing area, 321a—heat sink, 322a—fluorescent sheet, 323a—heat-dissipating adhesive, 324a—sapphire sheet, 325a—light detection plate, 326a—fixed sheet metal, 400a—laser head, 401a—lighting light, 322b—fluorescent sheet, 324b—sapphire layers, 400b—laser head, 401b—lighting light, 510—transmitting module, 511—infrared laser, 512—fixing base, 5121—baffle, 520—receiving module.

DETAILED DESCRIPTION OF THE EMBODIMENTS

The disclosure will be further illustrated in conjunction with the accompanying drawings.

For the convenience of understanding of the present disclosure, the present disclosure will be described more fully with reference to the relevant drawings. The drawings show preferred embodiments of the present disclosure. However, the present disclosure can be implemented in many different forms and is not limited to the embodiments described herein. Those of ordinary skill in the art will recognize that changes and modifications may be made to the various embodiments described herein without departing from the scope of the present disclosure as defined by the appended claims. In addition, descriptions of well-known functions and configuration may be omitted for clarity and conciseness.

It should be understood that when an element is referred to as being "fixed to" another element, it can be directly on that element or an intervening element(s) may also be present. When an element is considered to be "connected" to another element, it may be connected directly to that element or there may be an intervening element(s) therebetween at the same time.

Unless defined otherwise, all technical and scientific terms used herein have the same meanings as commonly understood by one of ordinary skill in the art to which this disclosure belongs. The terms used herein in the description of the present disclosure is for the purpose of describing particular embodiments only and is not intended to limit the present disclosure. The term "and/or" as used herein includes any and all combinations of one or more associated listed items.

In one of embodiments of the present disclosure, a driving assistance system is provided, and includes a light detection and ranging module, a LiFi driving module and a lighting module. The light detection and ranging module is configured to detect position parameters of objects around the light detection and ranging module. The LiFi driving module is connected to the light detection and ranging module. The LiFi driving module can receive the position parameters and modulate the position parameters to generate a LiFi signal. The lighting module is connected to the LiFi driving module, and is configured to provide lighting and transmit the LiFi signal simultaneously.

The operating principle is in that: the light detection and ranging module can detect the position parameters of surrounding objects (such as a distance L0 between the object and the light detection and ranging module, the orientation of the object with respect to the light detection and ranging module etc.); after receiving the position parameters, the LiFi driving module modulates the position parameters to generate the LiFi signal, and the LiFi signal may be transmitted directly with a lighting light of a lighting source at the same time. Specifically, referring to FIG. 1, when the above described driving assistance system is disposed on a host vehicle 10, the LiFi signal carrying information on position parameters transmitted forward by the light detection and ranging module can be received by an other vehicle 20 travelling ahead. When the other vehicle 20 travelling ahead receives the LiFi signal, it can make subsequent decisions based on contents of the signal. For example, when the information on the position parameters shows that the distance LO between two vehicles is too short, changing lanes or speeding up to increasing the distance between the two vehicles can be made by the other vehicle 20 travelling ahead, and blinking taillight may also be made to warn the vehicle behind it. When the other vehicle 20 travelling ahead is installed with a display module 21, the distance LO may also be displayed on the display module 21 for viewing by the host vehicle 10, which is convenient for the driver of the host vehicle 10 to get the information on the distance from the preceding vehicle timely and accurately.

In addition to carrying the information on position parameters, the LiFi signal can also carry other information, such as road condition, weather, route planning, and emergency situation etc., such that the vehicle becomes a moving information sharing base station in the internet of vehicles.

Figure 1:
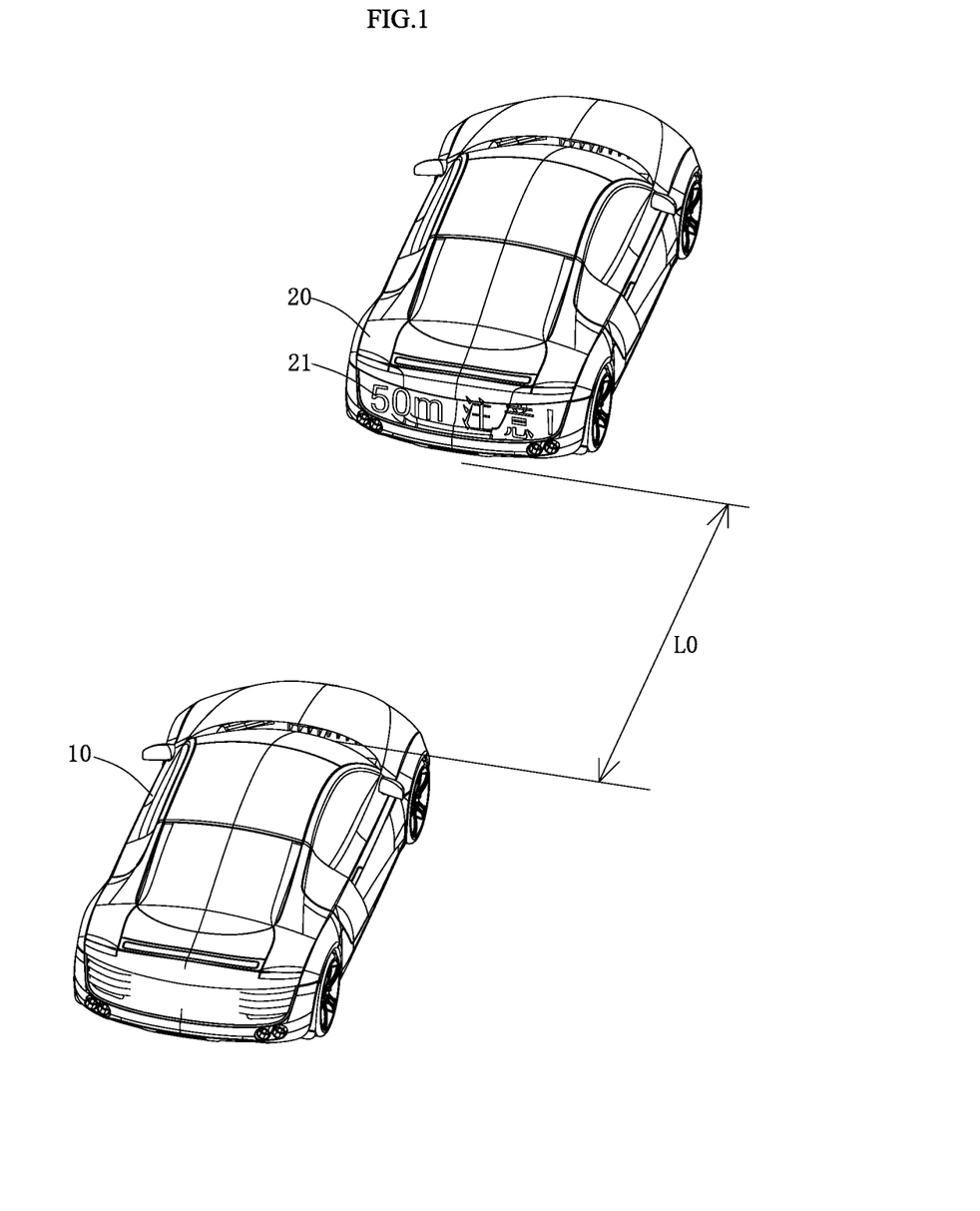
FIG. 1 is a schematic view of application scenario of a driving assistance system provided according to an embodiment.

In this embodiment, the light detection and ranging module can actively detect the position parameters of the surrounding objects (such as the other vehicle 20). The position parameters are modulated by the LiFi driving module and then be transmitted directly by the lighting module, thereby providing a transmission way for the position parameters. Upon getting the situation, the other vehicle 20 may take subsequent measures (such as blinking the taillight or displaying the distance to warn the host vehicle 10) timely to reduce the probability of occurring the collision accident. In addition, other data information such as distress information, entertainment information sharing, information on road condition, etc. may also be transmitted to the vehicle to which the lighting module can irradiate, and thereby facilitating the realizing of the shared transmission of private information between two vehicles. Private information is not easy to be stolen and better privacy is obtained by using LiFi to transmit V2V or V2X information than using other means.

According to the embodiment, the lighting module is further configured with the detection and transmitting data functions. The functionality and value of the lighting module are thus enhanced, which is more advantageous for catering to consumer needs and market promotion.

In the automatic driving of a vehicle, a distance parameter between the other vehicle 20 and the host vehicle 10 detected by a detecting assembly can usually be directly fed to the host vehicle 10 to assist driving. However, on one hand, for ensuring the safety of travelling, the driver of the host vehicle 10 cannot stare the screen all the time, on the other hand, in an environment using a lower level of automatic driving, when there are many other vehicles 20 around the host vehicle 10, while a potential rear-end collision situation occurs, the driver does not have a good way to know the distance information between the host vehicle 10 and a surrounding specific vehicle accurately, and thus he is not clear that which vehicle in the surrounding are closer to the host vehicle 10 and are easier to scratch. For this reason, in some embodiments, the light detection and ranging module, the LiFi driving module and the lighting module are provided on the host vehicle 10. A LiFi receiving module 520 and the display module 21 provided on the other vehicles 20 are further included. The LiFi receiving module 520 is configured to receive the LiFi signal transmitted by the lighting module and decode the LiFi signal into visual information. The display module 21 is connected to the LiFi receiving module 520 to display the visual information.

In this embodiment, the LiFi driving module of the host vehicle 10 may modulate the information to generate the LiFi signal and transmit the LiFi signal through the lighting source of the host vehicle 10. The LiFi signal can be received by the LiFi receiving module 520 installed on the other vehicle 20. The LiFi receiving module 520 can directly display the position parameters (distance LO between the two vehicles, direction, relative speed, etc.) in the signal through a display module 21 (such as a display screen, rear windshield projection display system, vehicle taillight with display function, vehicle rear floor projection display system, etc.) disposed at the rear end of the preceding vehicle, which is convenient for the driver of host vehicle 10 to know the information on the distance from the preceding vehicle accurately. In this embodiment, it is provided a good way for the driver of the host vehicle 10 to know the information on the distance from the other vehicle 20, especially when there are many vehicles near the host vehicle 10, the driver of the host vehicle 10 can know the information on the distance from each vehicles in real time. When there is a potential rear-end collision situation, necessary measures such as slowing down, changing lanes, adjusting the driving direction or the like can be taken timely depending on the circumstances, to avoid the occurrence of accidents, further reducing the probability of the occurrence of accidents.

The LiFi signal transmitted by the lighting source of the host vehicle 10 may also convey other information to other vehicle 20, such as road condition, weather, route planning, emergency condition etc. The information can be displayed by the displaying module 21 at the rear end of the preceding vehicle, so as to facilitate the driver of the host vehicle to view in real time.

In some embodiments, the light detection and ranging module and the lighting module are disposed at the head of the host vehicle 10, the LiFi receiving module 520 and the display module 21 are disposed at rear end of the other vehicle 20.

In this embodiment, the light detection and ranging module and the lighting module are disposed at the head of the host vehicle 10, which is advantageous to expand the detection angle and range of the light detection and ranging module, and reduce the detection blind zone. The LiFi receiving module 520 and the display module 21 are disposed at rear end of the other vehicle 20, which is advantageous to receive the LiFi signal, and meanwhile, which is convenient for the host vehicle 10 to view the information displayed on the display module 21.

In some embodiments, the light detection and ranging module includes a detecting light source and a detecting assembly that are connected with each other. The detecting light source is configured to generate a detecting light. The detecting assembly can transmit the detecting light outward so as to detect the position parameters of the object.

The lighting module includes a lighting source and a lighting assembly that are connected with each other. The lighting source is configured to generate a lighting light. The lighting assembly is configured to receive the lighting light and transmit it outward.

In this embodiment, the detecting assembly detects the position parameters of the object by emitting the detecting light. Specifically, the detecting light (such as infrared laser light) emitted outward by the detecting assembly can be reflected by the surface of an object when it encounters the object. After the reflected light that is transmitted back is received by the detecting assembly, the console of the vehicle can determine the orientation of the object with respect to the host vehicle 10 based on the incident angle of the received reflected light, and meanwhile, the distance LO between the object and the host vehicle 10 can be calculated based on the time interval between receiving the reflected light and emitting the detecting signal. The above description is a method of detecting the orientation of surrounding objects by using the principle of light reflection. Of course, in some other embodiments, the orientation of surrounding objects can also be detected by detecting other parameters fed by the detecting light, which are all fall within the protection range of the present disclosure.

In some embodiments, the LiFi driving module is integrated into a driver of the lighting source. This configuration is advantageous to saving installation space and overall miniaturization design. Of course, in some other embodiments, the LiFi driving module may be disposed outside the lighting source and connected to the lighting source, which is not limited herein.

Figure 2:
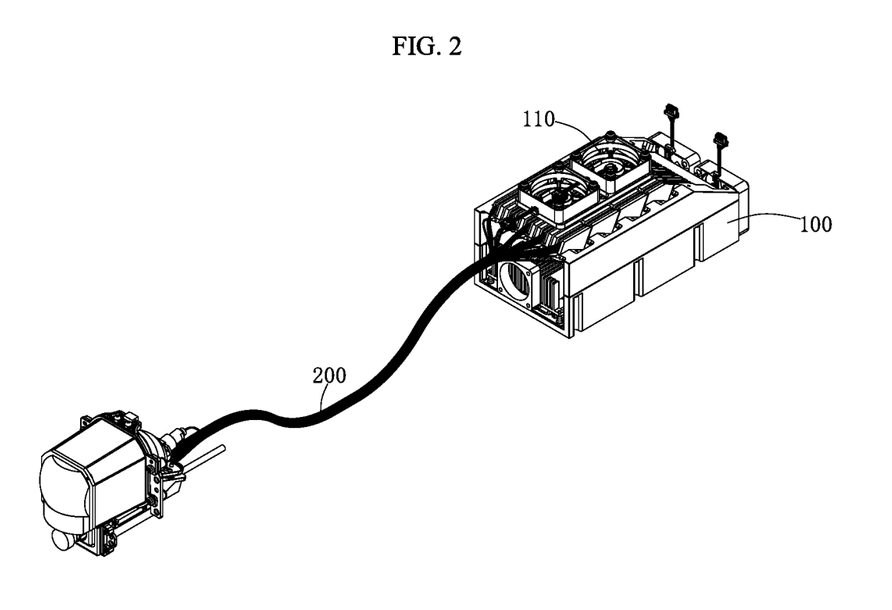
FIG. 2 is a schematic view of the overall structure of a light detection and ranging module and a lighting module provided according to an embodiment.

In practical installation, the detecting assembly may be installed at the front of the vehicle such as a position of radiator grille or bumper, and may also be directly installed into the interior of a vehicle lamp, but these installations all have certain problems: installing it at the bumper position, more wiring harnesses may be added additionally in the vicinity of the engine compartment, and an cleaning system is required additionally; when directly installing it into the interior of the vehicle lamp, the volume of the vehicle lamp may be large, and heat generated by the detecting assembly may bring additional burden on the heat dissipation of the vehicle lamp. Therefore, in some embodiments, the lighting source and the detecting light source are combined into a light source assembly 100. The light source assembly 100 is connected to the lighting assembly and the detecting assembly through a light transmission component 200, respectively.

The light source assembly 100 is independent of the lighting assembly and the detecting assembly, and is connected to the lighting assembly and the detecting assembly through the light transmission component 200, so that the generated lighting light and detecting light can be directly transmitted to the lighting assembly and the detecting assembly through the transmission component 200, for providing lighting and detecting the position, respectively.

In this embodiment, the independent installation of the light source assembly 100 has advantages as follows:

(1) since the light source assembly 100 is independent of the lighting assembly and the detecting assembly, the light source assembly 100 which occupies a large volume and generates a large amount of heat can be separated from other functional assemblies. The light source assembly 100 can quickly dissipate heat, if it is flexibly arranged in a place with good heat dissipation and ventilation conditions, for example, inside the engine compartment, inside the cockpit of the vehicle and the other similar position, and thus it is advantageous for extending the overall service life of the apparatus. Moreover, since the light source assembly 100 is independently provided, the light source assembly 100 can be provided in a position that is easily accessed by person when being installed. In this way, it is not only convenient for installation, but also facilitates maintenance and replacement, and facilitates subsequent maintenance.

(2) Since the light source assembly 100 with a larger volume is installed independently and the detecting assembly can be arranged adjacent to the lighting assembly with its smaller volume, it is advantageous for the overall miniaturization design of the modules. The additional space will not be occupied even if the detecting assembly is integrated with lighting assembly.

(3) Since the light source assembly 100 with a larger volume is provided independently and the heat dissipation problem is solved, the detecting assembly can be integrated with the lighting assembly and arranged at the installation position of the vehicle lamp, which is advantageous to expand the detection angle and range and reduce the detection blind zone. The means of connection of the lighting assembly, the detecting assembly and the light source assembly 100 is simple, there is no need to arrange a large number of connecting harnesses, thereby simplifying the structure, saving the installation space, and facilitating the subsequent maintenance and inspection.

(4) After combing with the lighting assembly, the detecting assembly can be fixed inside the vehicle lamp and thus be protected. In this way, the overall appearance of the vehicle is not affected, and it is not contaminated by dust when being provided inside the vehicle lamp.

In some embodiments, a heat dissipating device 110 such as an air-cooled heat sink or a water-cooled heat sink may also be disposed on the light source assembly 100, so that the air-cooled or water-cooled method is adopted to dissipate heat generated by the light source assembly 100.

Figure 3:
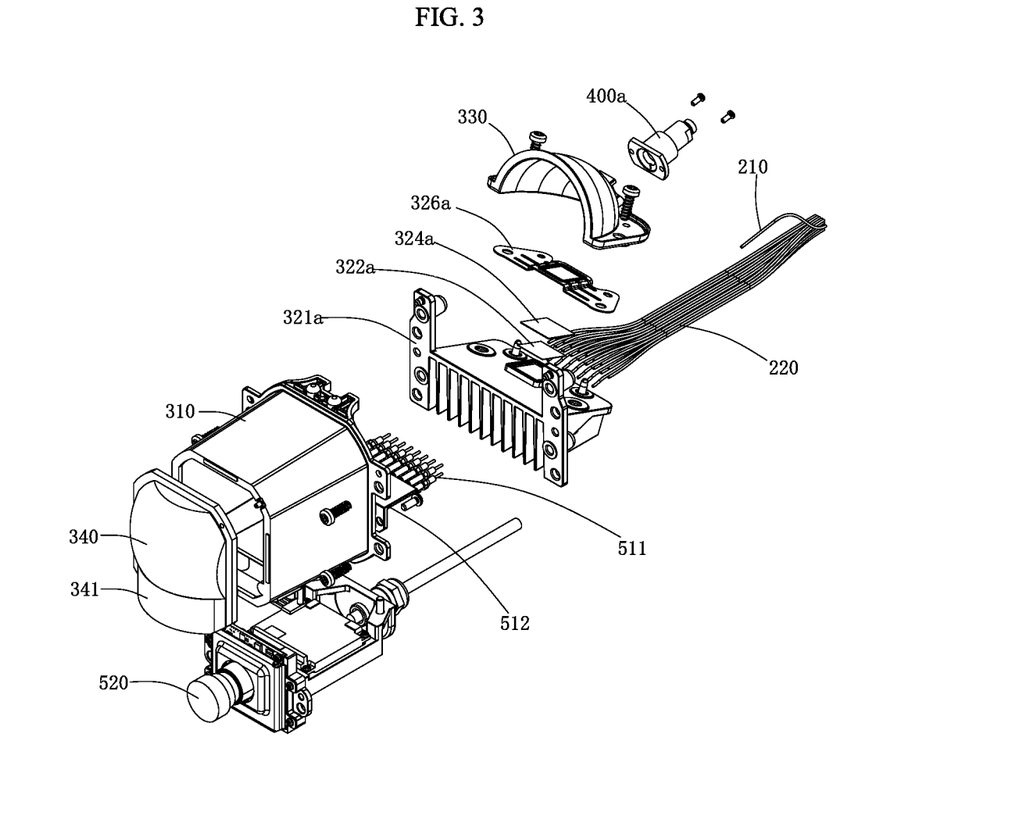
FIG. 3 is an explosive view of a lighting assembly and a detecting assembly in the light detection and ranging module and a lighting module of FIG. 2.
Figure 4:
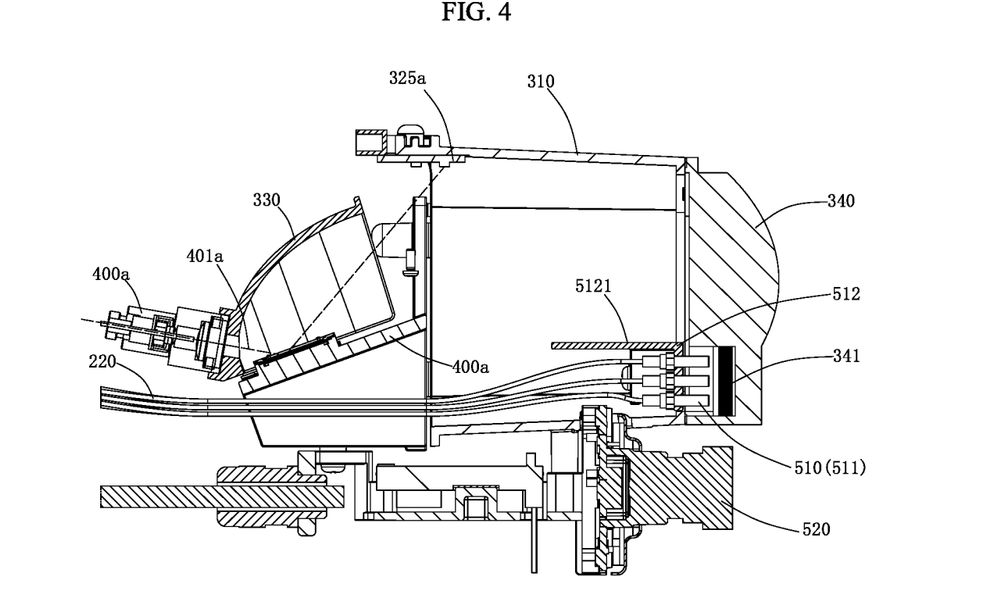
FIG. 4 is a view of interior structure of the lighting assembly and the detecting assembly in the light detection and ranging module and a lighting module of FIG. 2.

Referring to FIGS. 3 and 4, in some embodiments, the lighting assembly includes: a mounting housing 310, a fluorescent component, a light gathering unit 330 and a lens unit 340. The mounting housing 310 forms a cavity that passes through the housing from the housing's front to its back. The fluorescent component is disposed at the rear end of the mounting housing 310, and the fluorescent component is located on the light path of the lighting light transmitted by the light transmission component 200, and is configured to emit visible light under the excitation of the lighting light. The light gathering unit 330 is disposed on the side of the fluorescent component, and configured to gather the visible light to form a lighting beam and transmit the lighting beam in the cavity. The lens unit 340 is disposed at the front end of the mounting housing 310 and configured to adjust the lighting beam so as to emit it outward at a certain angle.

Specifically, a reflecting mirror may be selected to use as the light gathering unit 330. In this embodiment, the lighting light is used as an exciting light. For example, a blue laser light with high-energy may be selected as the lighting light. Specifically, the lighting light (such as the blue laser light) transmitted to the lighting assembly through the light transmission component 200 may be emitted by a laser head disposed at the rear end of the mounting housing 310. The fluorescent component can undergo energy level transition and emit visible fluorescent light under the excitation of the lighting light. The visible light is gathered by the light gathering unit 330 to form a visible light beam and then passes through the lens unit 340, and thus to be emitted outward to provide lighting.

In this embodiment, the light gathering unit 330 and the lens unit 340 gather the fluorescent light to form a visible light beam, and adjust the visible light beam. The mounting housing 310 provides a space for the transmission of the visible light beam. The visible fluorescent light emitted by the fluorescent component has a high lighting brightness, and has lesser energy consumption than that of lighting used by a conventional method under a condition of requiring the same lighting intensity, which saves costs. In addition, since the fluorescent components with different colors can emit lights with different colors after being excited, the fluorescent components with different colors can be provided according to the actual color needs for the emitted light. Therefore, the lights with the required color can be excited, eliminating the need to pre-modulate the light source or replace different types of the light source assembly 100. It has a stronger adaptability to different light emission requirements, and it also simplifies the structure of the entire lighting assembly and makes it more convenient to be used.

Figure 5:
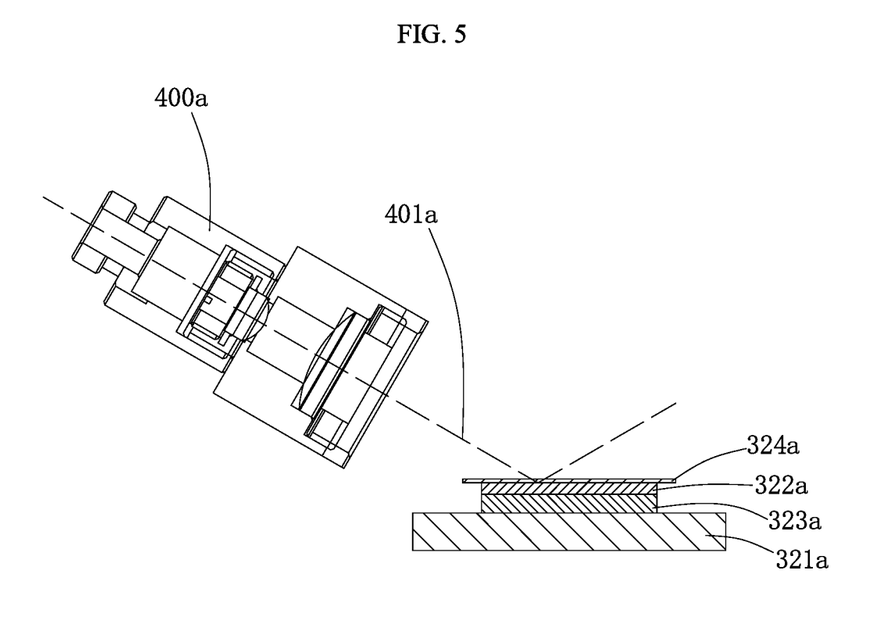
FIG. 5 is a schematic view of a lighting light irradiating on a fluorescent component in the lighting assembly of FIG. 4.

Referring to FIGS. 4 and 5, in some embodiments, the fluorescent component includes a heat sink 321a and a fluorescent sheet 322a. The heat sink 321a is fixed at the rear end of the mounting housing 310. The fluorescent sheet 322a is fixed at the heat sink 321a and located on the light path of the lighting light. The fluorescent sheet 322a can receive and reflect the lighting light. The surface of the fluorescent sheet 322a faces the light gathering unit 330.

Specifically, a lighting light 401a (such as a blue laser light) transmitted by the light transmission component 200 may be emitted by a laser head 400a provided at the rear end of the mounting housing 310. The laser head 400a contains an optical assembly therein, which is configured to preliminarily shape the lighting light. The surface of the fluorescent sheet 322a is excited to emit the visible fluorescent light by the irradiation of the lighting light 401a. The fluorescent light is directly gathered by the light gathering unit 330 to form a visible light beam. The lighting light 401a irradiated to the surface of the fluorescent sheet 322a can be simultaneously reflected by the fluorescent sheet 322a. The heat sink 321a provides an installation space for the fluorescent sheet 322a, and meanwhile, it can timely dissipate the heat generated when emitting the fluorescent light, to avoid the entire apparatus to be damaged due to excessive heat. In one or more embodiments, the fluorescent sheet 322a is attached to the surface of the heat sink 321a through a heat-dissipating adhesive 323a, to further improve the heat dissipation effect. In addition, after the fluorescent sheet 322a is attached to the heat sink 321a, a fixed sheet metal 326a can be provided around the fluorescent sheet 322a, to prevent the fluorescent sheet 322a comes off.

In some embodiments, an included angle between the surface of the fluorescent sheet 322a and the lighting light 401a transmitted by the light transmission component 200 is an acute angle, which can conveniently reflect the lighting light 401a directly outward.

With the configuration of this embodiment, the lighting light 401a can be directly reflected, and the surface of the fluorescent sheet 322a faces the light gathering unit 330, which is advantageous for gathering fluorescent light. The fluorescent sheet 322a is directly attached to the heat sink 321a, which is convenient to dissipate heat in time, to ensure fluorescent light conversion efficiency.

Further, a light detection plate 325a is further included, which is provided on the light path of the lighting light 401a reflected by the fluorescent sheet 322a, for detecting the energy of the lighting light 401a reflected by the fluorescent sheet 322a. This is because the lighting light 401a (such as a blue laser light) that is the excitation light usually has a higher energy. When the reflected lighting light 401a has a higher energy, it will bring damage to the human eyes, especially when the fluorescent sheet 322a fails, the lighting light 401a is totally reflected by the fluorescent sheet 322a. Once it enters the human eyes, it will directly cause blindness. Instead, the light detection plate 325a can be used to detect the energy of the lighting light 401a reflected by the fluorescent sheet 322a. When the detected energy of the light is larger, the light source assembly 100 can be turned off or the lighting power thereof can be reduced, to protect human eyes. When specially using it, the light detection plate 325a can be directly connect with a vehicle control component, so that the energy value detected by the light detection plate 325a can be fed to the vehicle control component directly. The vehicle control component determines that the light source assembly 100 is automatically turn off or the lighting power thereof is automatically lowered when the detected energy value exceeds an energy threshold that is set internally.

Further, the surface of the fluorescent sheet 322a is covered with a sapphire sheet 324a. The sapphire sheet 324a can increase the light transmittance. On the one hand, it is advantageous for the lighting light 401a as the excitation light to transmit through and contact the fluorescent sheet 322a. On the other hand, it is advantageous for the fluorescent light generated by the fluorescent sheet 322a to transmit through and be incident on the light gathering unit 330.

Figure 6:
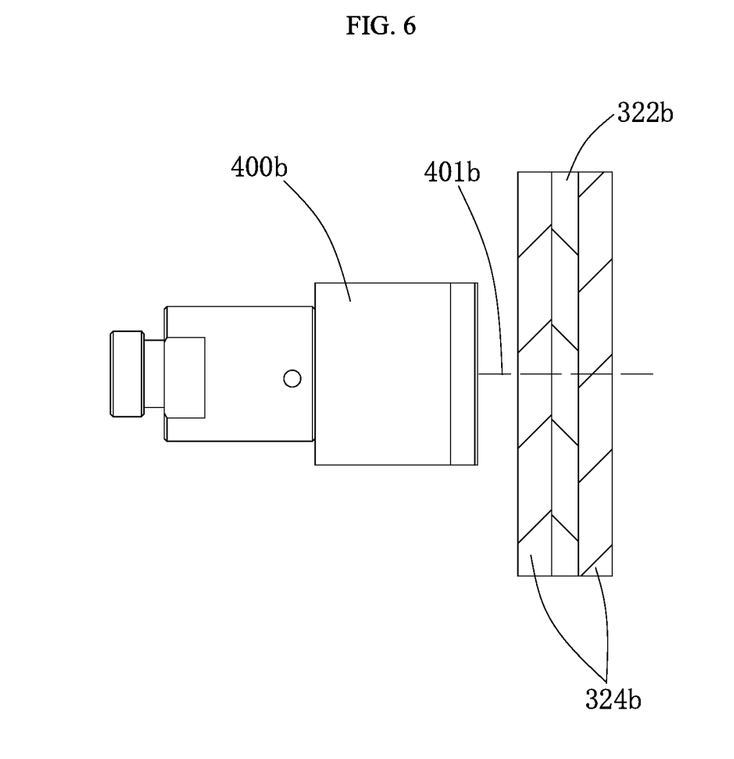
FIG. 6 is a schematic view of the fluorescent component cooperating with the lighting light provided according another embodiment.

Referring to FIG. 6, in some embodiments, the fluorescent component includes a fluorescent sheet 322b located on the light path of the lighting light. The fluorescent sheet 322b may receive the lighting light and transmit the lighting light.

Specifically, the lighting light 401b (such as a blue laser light) transmitted by the light transmission component 200 may be emitted by the laser head 400b. The fluorescent sheet 322b is excited by the lighting light 401b that is incident on its surface to emit fluorescent light. The lighting light 401b can directly pass through the fluorescent sheet 322b, so that adopting the configuration of this embodiment can directly transmit the lighting light 401b, and the configuration is simple. In one or more embodiments, the surface of the fluorescent sheet 322b is at a right angle to the lighting light 401b transmitted by the light transmission component 200, the surface of the fluorescent sheet 322b is at a right angle to the lighting light 401b transmitted by the light transmission component 200, which is advantageous for receiving the lighting light 401b that is the excitation light as much as possible, and the excess lighting light 401b can directly transmit through the fluorescent sheet 322b and be emit outward.

Both sides of the fluorescent sheet 322b are provided with sapphire layers 324b. The sapphire layers 324b are configured to dissipate heat and can increase the transmittance of fluorescent light. Specifically, the sapphire layers 324b directly attach to the fluorescent sheet 322b, and thus it can timely dissipate the heat generated when the fluorescent sheet 322b emits fluorescent light, so as to avoid the entire apparatus to be damaged by excessive heat. Meanwhile, the sapphire layer 324b can increase the light transmittance. On the one hand, it is advantageous for the lighting light 401b as the excitation light to transmit through and contact the fluorescent sheet 322b. On the other hand, it is advantageous for the fluorescent light generated by the fluorescent sheet 322b to transmit through and be incident on the light gathering unit 330.

It can be understood that, in other embodiments, the lighting assembly may be a reflection condenser lens provided on the light path of the lighting light transmitted by the light transmission component 200. In this case, the lighting light is directly selected as visible light, and the visible light passes through the reflection condenser lens and is emitted outward to provide lighting. However, the disclosure does not limit thereto.

Referring to FIG. 4, in some embodiments, the detecting assembly includes a transmitting module 510 and a receiving module 520. The transmitting module 510 is connected to the other end of the light transmission component 200, and is configured to emit the detecting light transmitted by the light transmission component 200 outward. The receiving module 520 is configured to receive the reflected light of the detecting light.

Specifically, the detecting light emitted outward by the transmitting module 510 can be reflected by the surface of an object when it encounters the object. After the reflected light is received by the receiving module 520, the orientation of the object with respect to the detecting assembly can be determined based on the incident angle of the received reflected light, and the distance LO between the object and the detecting assembly can be calculated based on the time interval between the received reflected light and the emitted detecting light.

Referring to FIG. 4, in some embodiments, the transmitting module 510 is disposed on the side of the lighting assembly, and the lens unit 340 is provided with a light-uniformizing area 341 for uniformizing the detecting light emitted by the transmitting module 510 into a light beam with a uniform light intensity distribution and emitting it at a specific emitting angle. Specifically, the light-uniformizing area 341 may be a microstructure separately processed on the surface of the lens unit 340. When the detecting light (such as an infrared laser light) enters the lens unit 340, the microstructure can shape the detecting light, to make the light transmitted by the lens unit 340 to form an area array laser surface with a uniform light intensity distribution and a specific field angle, thereby achieving the purpose of adjusting the light path of the detecting light. The transmitting module 510 can be disposed on one side of the lighting assembly or around the lighting assembly. Since the transmitting module 510 and the lighting assembly use the same lens unit 340 for light adjustment, one lens unit 340 can function as both lighting and detecting. In this way, element manufacturing cost can be saved, and the combined structure is more compact.

In some embodiments, the light-uniformizing area 341 is disposed at an edge of the side of the lens unit 340 or is disposed around the lens unit 340. Adopting this configuration, the transmitting module 510 is also disposed to be close to the side of the lens unit 340 or is disposed around the lens unit 340, which is advantageous for the overall miniaturization and intensive design of the apparatus.

In some embodiments, the transmitting module 510 is fixed to an inner wall of the mounting housing 310, and the transmitting module 510 is separated from the lighting beam by a partition. In this embodiment, the provided partition separates the transmitting module 510 and the light beam, and thus the detecting light emitted by the transmitting module 510 and the lighting beam do not interfere with each other, thereby the case that mutual interference of light signals reduces the use effect can be prevented.

Figure 7:
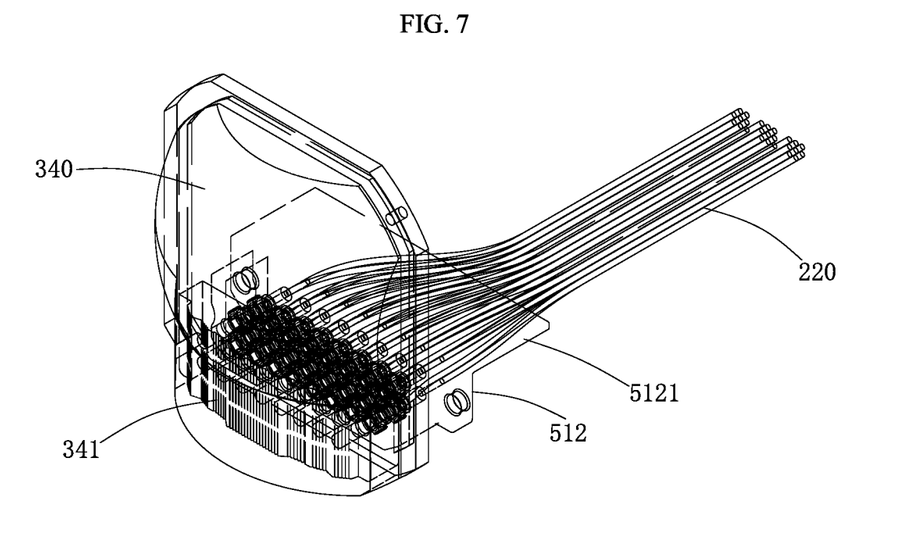
FIG. 7 is a schematic view of a configuration of an emitting module cooperating with a lens unit in the light detection and ranging module of FIG. 2.

Continuing to refer to FIG. 4, in some embodiments, the transmitting module 510 includes one or more infrared lasers 511. The infrared laser(s) 511 is fixed to the inner wall of the mounting housing 310 through a fixing base 512. The fixing base 512 is provided with a baffle 5121 for separating the transmitting module 510 from the lighting beam. As shown in FIG. 7, a plurality of infrared lasers 511 are respectively fixed on the fixing base 512, and then the fixing base 512 is inserted into the mounting housing 310 at the rear end of the mounting housing 310. The front end of the infrared lasers 511 face light-uniformizing area 341 on the lens unit 340. The infrared laser light emitted by the infrared lasers 511 is light-uniformized and adjusted by the light-uniformizing area 341 and then passes through the lens unit 340 and is emitted uniformly. The baffle 5121 separates the infrared lasers 511 and the lighting beam, thereby reducing the probability that the infrared laser light emitted by the infrared lasers 511 and the lighting beam interfere with each other, which is advantageous for improving the use effect.

The infrared lasers 511 may be used in conjunction with a receiving module 520 such as an infrared receiver. In one or more embodiments, the receiving module 520 is disposed on the side of the mounting housing 310. Adopting this configuration, the receiving module 520 is adjacent to the lighting assembly, which is advantageous for the overall miniaturization and intensive design of the apparatus. The infrared lasers 511 emit the infrared laser light, thereby making it possible to implement infrared area array detection. The infrared receiver performs the detection by receiving the reflected light of the infrared area array laser light, i.e. combining into flash LiDAR (flash area-array lidar), where the emitted infrared laser light may be a light pulse, or may be a continuous wave. When emitting light pulses, the pulse width can be specially modulated, and thus the case that the apparatuses do not interfere with each other when multiple infrared lasers 511 are operating at the same time can be ensured.

The infrared laser light emitted by the infrared lasers 511 may have a variety of wavelengths, preferably 905 nm, 940 nm, or 1550 nm. Through testing, 905 nm and 940 nm are adopted, because that the infrared laser light having the two wavelength is located in the weak part of the energy distribution of each wavelength of sunlight, which can increase the signal to noise ration of the system. The advantage of adopting 1550 nm is not only that it is located in the weaker part of the energy distribution of wavelength of sunlight, but also that it is safer for the human eyes, and the power output at the transmitting end can be further increased to achieve a longer detection distance.

It can be understood that, in some other embodiments, the detecting assembly may also adopt other radar technology solutions such as MEMS scanning lidar, mechanical galvanometer scanning lidar, OPA optical phased array lidar, etc., which are not limited herein.

Referring to FIG. 3, in some embodiments, the light transmission component 200 includes lighting-conducting fibers 210 and detecting-conducting fibers 220. Two ends of the lighting-conducting fibers 210 are connected to the lighting source and the lighting assembly respectively, for transmitting the lighting light to the lighting assembly. Two ends of the detecting-conducting fibers 220 are connected to the detecting light source and the detecting assembly respectively, for transmitting the detecting light to the detecting assembly. Specifically, the two ends of the lighting-conducting fibers 210 may be coupled with the lighting sources in the lighting assembly and the light source assembly 100, respectively, for transmitting the lighting light. The two ends of the detecting-conducting fibers 220 may be coupled with the detecting light sources in the detecting assembly and the light source assembly 100, respectively, for transmitting the detecting light. In some other embodiments, the light transmission component 200 includes only one fiber. A plurality of fibers arranged in parallel in the fibers can be configured to transmit the lighting light and the detecting light, which are not limited herein.

Each of the technical features of the embodiments described above can be arbitrarily combined. In order to simplify the description, all possible combinations of each technical features in the above embodiments have not been described. However, as long as there is no contradiction in the combination of these technical features, it should be considered as that all of them fall within the scope described in this specification.

The above described embodiments only present several implementation manners of the present disclosure, and descriptions thereof are more specific and detailed, but they cannot be understood as limiting the scope of the invention patent. It should be noted that, to those of ordinary skill in the art, several modifications and improvements can be made without departing from the concept of the present disclosure, which all fall within the protection scope of the present disclosure. Therefore, the protection scope of this invention patent shall be subject to the appended claims.

What is claimed is:

1. A driving assistance system, comprising:
a light detection and ranging module configured to detect position parameters of objects around the light detection and ranging module;
a LiFi driving module connected to the light detection and ranging module, the LiFi driving module being configured to be capable of receiving the position parameters and modulate the position parameters to generate a LiFi signal; and
a lighting module connected to the LiFi driving module and configured to provide lighting and transmit the LiFi signal.

2. The driving assistance system according to claim 1, wherein the light detection and ranging module, the LiFi driving module and the lighting module are provided on a host vehicle, and
wherein the driving assistance system further comprises a LiFi receiving module and a display module provided on another vehicle, the LiFi receiving module being configured to receive the LiFi signal transmitted by the lighting module and decode the LiFi signal into visual information, the display module being connected to the LiFi receiving module and used to display the visual information.

3. The driving assistance system according to claim 2, wherein the light detection and ranging module and the lighting module are disposed at a head of the host vehicle, and the LiFi receiving module and the display module are disposed at rear end of the another vehicle.

4. The driving assistance system according to claim 1, wherein the light detection and ranging module comprises a detecting light source and a detecting assembly that are connected with each other, in which the detecting light source is configured to generate a detecting light, and the detecting assembly is capable of transmitting the detecting light outward so as to detect the position parameters of the objects, and
wherein the lighting module comprises a lighting source and a lighting assembly that are connected with each other, in which the lighting source is configured to generate a lighting light, and the lighting assembly is configured to receive the lighting light and transmit it outward.

5. The driving assistance system according to claim 4, wherein the LiFi driving module is integrated into a driver of the lighting source.

6. The driving assistance system according to claim 4, wherein the lighting source and the detecting light source are combined into a light source assembly, and the light source assembly is connected to the lighting assembly and the detecting assembly through a light transmission component, respectively.

7. The driving assistance system according to claim 6, wherein the lighting assembly comprises:
a mounting housing forming a cavity passing therethrough;
a fluorescent component disposed at a rear end of the mounting housing, and the fluorescent component being located on a light path of the lighting light transmitted by the light transmission component and used to emit visible light under the excitation of the lighting light;
a light gathering unit disposed on a side of the fluorescent component, and configured to gather the visible light to form a lighting beam and transmit the lighting beam in the cavity;
a lens unit disposed at a front end of the mounting housing and configured to form the lighting beam to be a light emitted outward at a certain angle.

8. The driving assistance system according to claim 7, wherein the fluorescent component comprises:
a heat sink fixed at the rear end of the mounting housing; and
a fluorescent sheet fixed at the heat sink and located on the light path of the lighting light, and the fluorescent sheet being configured to be capable of receiving and reflecting the lighting light, a surface of the fluorescent sheet facing the light gathering unit.

9. The driving assistance system according to claim 8 further comprises a light detection plate provided on the light path of the lighting light reflected by the fluorescent sheet for detecting energy of the lighting light reflected by the fluorescent sheet.

10. The driving assistance system according to claim 7, wherein the fluorescent component comprises a fluorescent sheet located on the light path of the lighting light in which the fluorescent sheet is capable of receiving the lighting light and transmit the lighting light.

11. The driving assistance system according to claim 10, wherein both sides of the fluorescent sheet are provided with sapphire layers.

12. The driving assistance system according to claim 7, wherein the detecting assembly comprise a transmitting module and a receiving module, in which the transmitting module is connected to other end of the light transmission component and is configured to emit the detecting light transmitted by the light transmission component outward, and the receiving module is configured to receive a reflected light of the detecting light.

13. The driving assistance system according to claim 12, wherein the transmitting module is disposed on a side of the lighting assembly, and the lens unit is provided with a light-uniformizing area for uniformizing the detecting light emitted by the transmitting module into a light beam with a uniform light intensity distribution and a specific emitting angle.

14. The driving assistance system according to claim 13, wherein the light-uniformizing area is disposed at an edge of a side of the lens unit or is disposed around the lens unit.

15. The driving assistance system according to claim 13, wherein the transmitting module is fixed to an inner wall of the mounting housing, and the transmitting module is separated from the lighting beam by a partition.

16. The driving assistance system according to claim 15, wherein the transmitting module comprises one or more infrared lasers, the one or more infrared lasers are fixed to the inner wall of the mounting housing through a fixing base, and the fixing base is provided with a baffle for separating the transmitting module from the lighting beam.

17. The driving assistance system according to claim 6, wherein the light transmission component comprises lighting-conducting fibers and detecting-conducting fibers, two ends of the lighting-conducting fibers are connected to the lighting source and the lighting assembly respectively, for transmitting the lighting light to the lighting assembly, and two ends of the detecting-conducting fibers are connected to the detecting light source and the detecting assembly respectively, for transmitting the detecting light to the detecting assembly.

\* \* \* \* \*